US005515587A

United States Patent [19]

Pool

[11] Patent Number: 5,515,587

[45] Date of Patent: May 14, 1996

[54] REVERSIBLE HAND OPERATED PLIERS

[75] Inventor: James L. Pool, Clarinda, Iowa

[73] Assignee: The Lisle Corporation, Clarinda, Iowa

[21] Appl. No.: 297,604

[22] Filed: Aug. 29, 1994

[51] Int. Cl.[6] ....................................... B23P 19/04

[52] U.S. Cl. ............................... 29/229; 29/268; 81/302; 81/416

[58] Field of Search ........................ 29/229, 268; 81/302, 81/300, 416

[56] References Cited

U.S. PATENT DOCUMENTS

| | | | |
|---|---|---|---|
| 21,525 | 9/1858 | Sykes . | |
| 514,799 | 2/1894 | Wildt . | |
| 816,674 | 4/1906 | Medhus . | |
| 1,122,165 | 12/1914 | Schoening . | |
| 1,262,621 | 4/1918 | Beacham . | |
| 1,514,488 | 11/1924 | Wernimont . | |
| 2,058,072 | 10/1936 | Fiddyment . | |
| 2,166,089 | 7/1939 | Brenner . | |
| 2,168,812 | 8/1939 | van Keuren . | |
| 2,325,035 | 7/1943 | Cargile . | |
| 2,483,383 | 9/1949 | Heimann et al. . | |
| 2,684,004 | 7/1954 | Holtzapple . | |
| 2,737,837 | 3/1956 | Stillwell . | |
| 3,132,550 | 5/1964 | Sion . | |
| 3,662,449 | 5/1972 | Hashimoto . | |
| 3,681,840 | 8/1972 | Pool . | |
| 3,762,019 | 10/1973 | Epstein . | |
| 4,280,265 | 7/1981 | Murphy . | |
| 4,476,750 | 10/1984 | Murphy . | |
| 4,776,245 | 10/1988 | Gustavsson | 29/229 |
| 4,793,224 | 12/1988 | Huang et al. | 29/229 |

*Primary Examiner*—Robert C. Watson
*Attorney, Agent, or Firm*—Banner & Allegretti, Ltd.

[57] ABSTRACT

A reversible hand pliers provides for movement of the jaws of the pliers in the same direction as the movement of the hand grips or in the opposite direction depending upon the manner in which the separate handles are engaged with the separately moveable jaws. The handles are substantially identical in construction as are the jaws. Pivoting of the handles with respect to the jaws is effected by movement of the handles from a coplanar position on one side of the jaws through approximately a 180° rotation to a coplanar position on the opposite side of the jaws.

6 Claims, 6 Drawing Sheets

FIG. 3
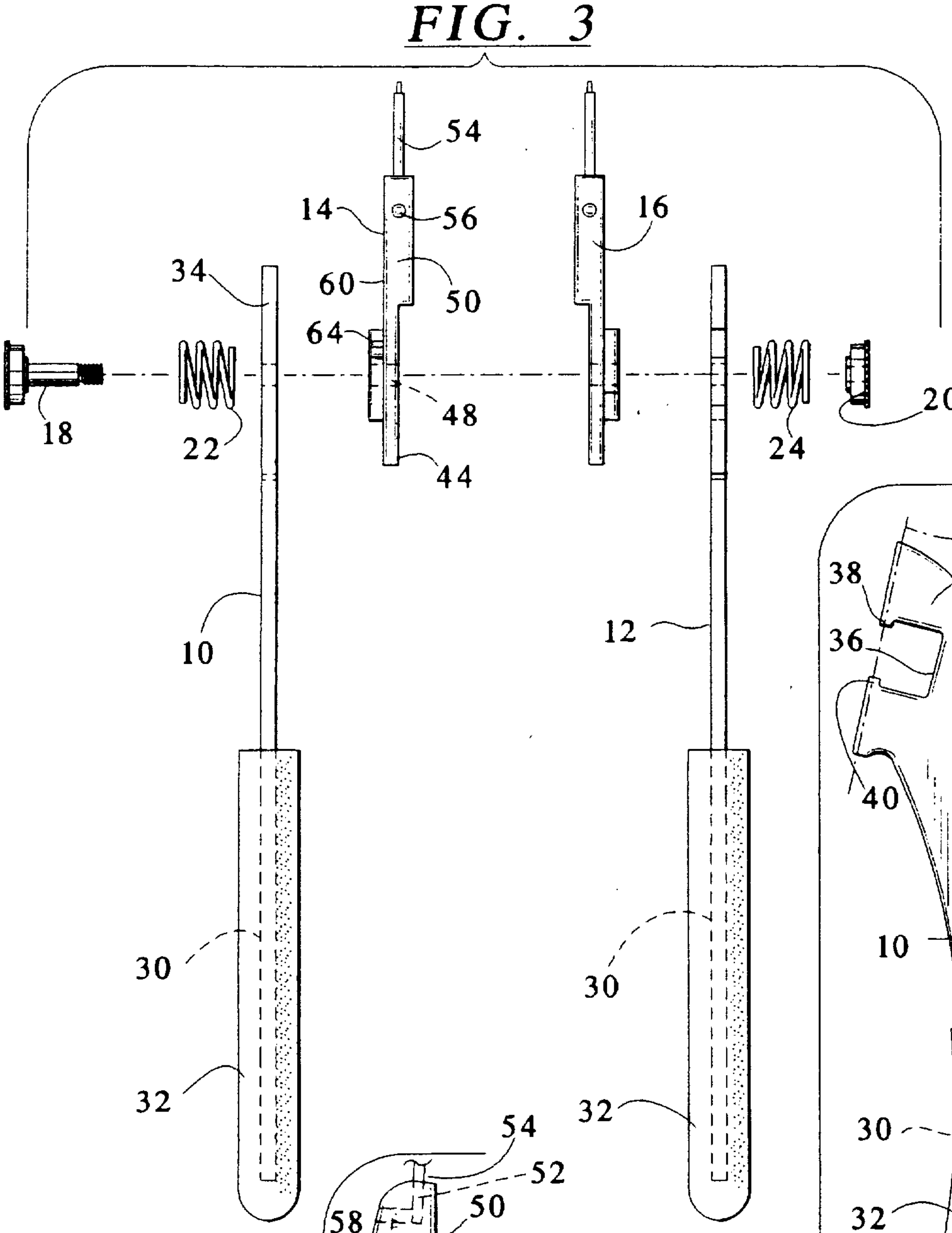
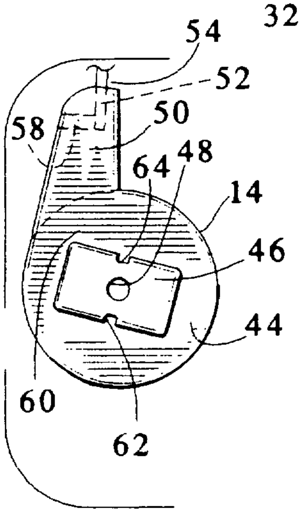
FIG 8
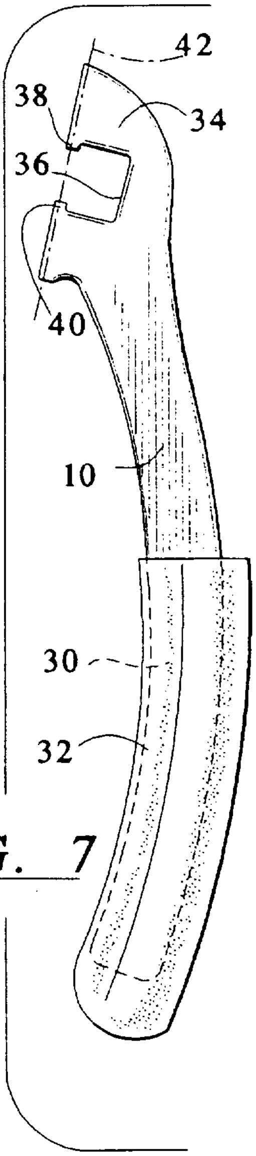
FIG. 7

REVERSIBLE HAND OPERATED PLIERS

BACKGROUND OF THE INVENTION

This invention relates to a reversible pliers construction wherein the sense or direction of movement of the jaws of the pliers in response to movement of the hand grips is reversible.

Snap rings and other fastener elements are often used to lock a bearing or shaft or other mechanical element into position. To remove or replace the bearing, shaft or element, it is therefore necessary to initially expand or contract the snap ring. Heretofore removal of a snap ring has often been effected by special pliers which include pins designed to engage openings in the end of the snap ring and either expand or contract the ring so that it may be easily removed. The pins or end pieces which engage the snap ring, thus, either expand or compress the snap ring depending upon the particular application. Thus, in some cases the snap ring must be compressed by drawing the ends of the ring toward each other and then removing the ring from its position. In other situations, the ends of the snap ring must be expanded to remove the ring. Other applications besides removing a snap ring exist wherein a pliers type tool is used to either compress or expand a mechanical element for its removal and replacement.

In the past, expansion and compression of the ends of a snap ring have been effected by separate tools. More recently, a single tool which is convertible or reversible has been utilized. Examples of convertible snap ring pliers include Schaaff in U.S. Pat. No. 2,546,616, Heimann, et al in U.S. Pat. No. 2,483,383, Pool in U.S. Pat. No. 3,681,840, Murphy in U.S. Pat. No. 4,280,265 and Murphy in U.S. Pat. No. 4,476,750. The listed prior art tools are effective for accomplishing their goals. There has remained, however, the need for an improved, simply operated, easily convertible or reversible snap ring pliers.

SUMMARY OF THE INVENTION

In a principal aspect, the present invention comprises a reversible pliers which includes a pair of jaws mounted on a pivot member. The jaws are moveable toward and away from one another and include outwardly projecting, axial hubs that are keyed to receive separate handle members. The handle members are biased into engagement with the hubs and may be pivoted or engaged with the hubs in a first or second hub engagement position. When the handles are biased into their first hub engagement position, the snap ring pliers operates to move the jaws and the handles simultaneously in the same direction toward or away from each other. Such a configuration is useful for removing a snap ring which requires compression of the ring. When the handles are pivoted to the second hub engagement position, the jaws move in an opposite direction relative to the movement of the handles. Such a configuration is especially useful in removing a snap ring which must be expanded.

Thus it is an object of the present invention to provide an improved reversible pliers construction.

It is a further object of the present invention to provide an improved reversible pliers construction which may be utilized in combination with snap ring engaging pins for removal or placement of the snap rings which must be either expanded or contracted.

Yet a further object of the invention is to provide a reversible pliers construction wherein the mechanism for effecting reverse operation is incorporated into the connection between manual handles and separate operating jaws of the pliers.

Yet another object of the invention is to provide a reversible pliers construction which is rugged and yet which is easy to operate requiring a minimum of adjustment and which is also economical to manufacture.

A further object of the invention is to provide a reversible pliers construction wherein each of the jaws may be substantially identical and each of the separate handles may be substantially identical.

These and other objects, advantages and features of the invention are set forth in greater detail in the description and drawing which follow.

BRIEF DESCRIPTION OF THE DRAWING

In the detailed description which follows, reference will be made to the drawing comprised of the following figures:

FIG. 3 is an exploded side view of the pliers;

FIG. 7 is a plan view of a handle; and

FIG. 8 is a plan view of a jaw.

DESCRIPTION OF THE PREFERRED EMBODIMENT

Figure 1:
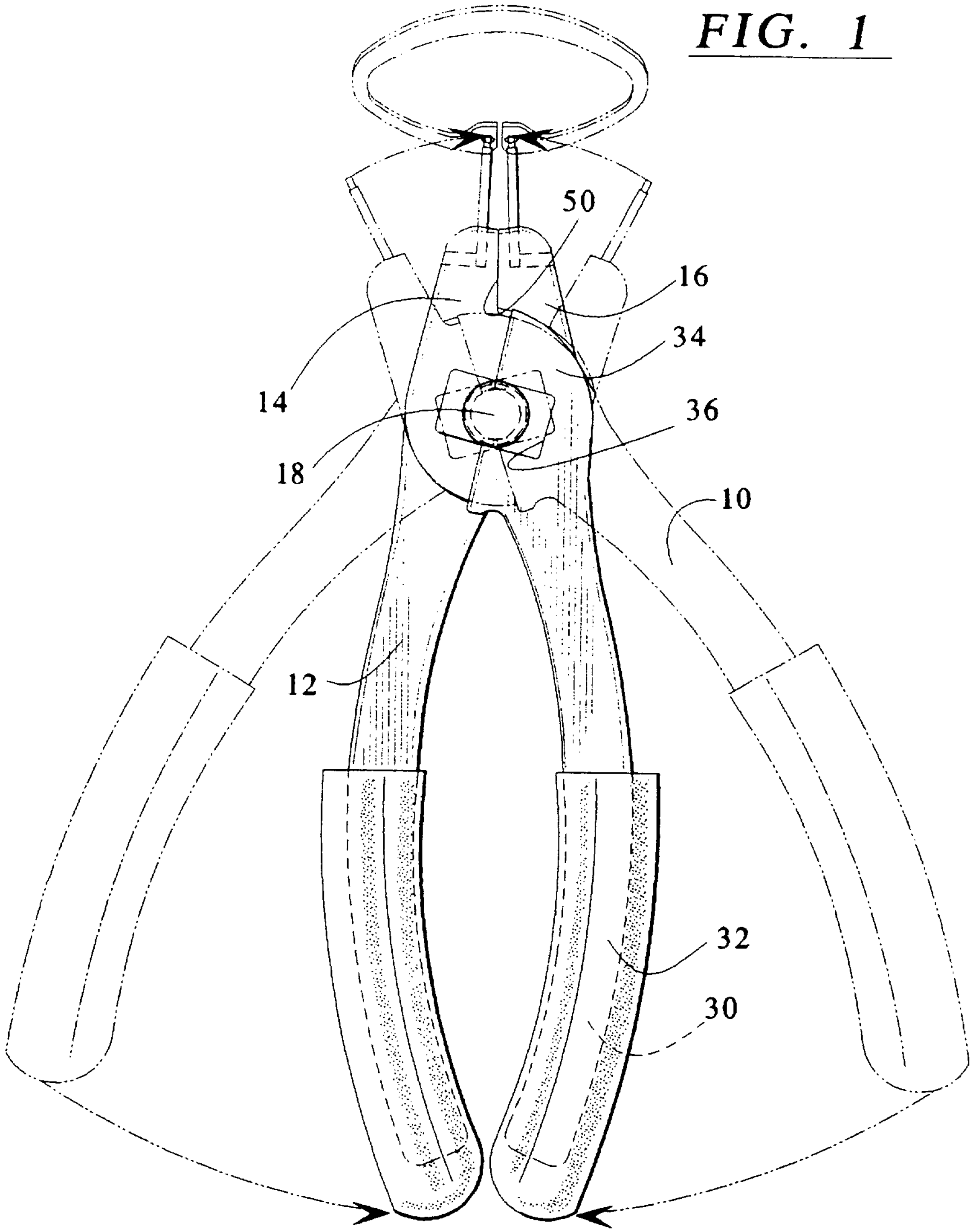
FIG. 1 is a plan view of the improved reversible pliers wherein the hand grips and jaws move in the same sense.

Referring to the figures, the preferred embodiment of the invention is comprised of eight separate elements which coact to provide the reversible pliers. Utilization of the eight elements described is not a limiting feature of the invention and constitutes merely the preferred embodiment described herein. Specifically, there is a first handle 10 and a second handle 12 coacting respectively with a first jaw 14 and a second jaw 16. The jaws 14, 16 are held together by means of a pivot member comprised of a threaded bolt 18 cooperative with a threaded nut 20. Spiral or coil biasing springs 22 and 24 mounted on the bolt 18 coact with the jaws 14, 16 and engage with the first handle 10 and/or second handle 12 to thereby bias the handles 10, 12 into an operative and locked or engaged position with their associated jaw 14, 16. The jaws 14 and 16 are adapted to receive snap ring engaging pins 26 and 28 respectively.

Figure 2:
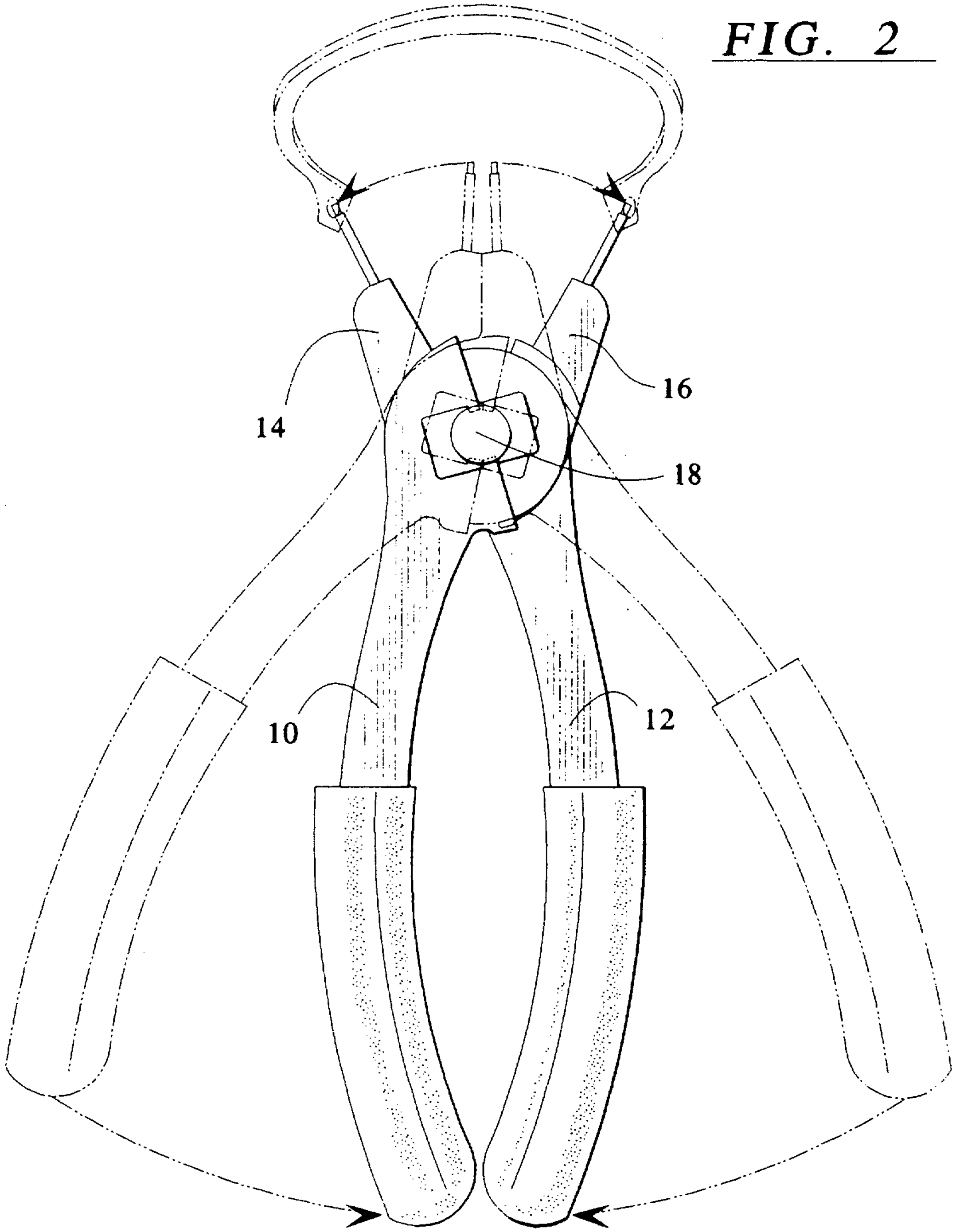
FIG. 2 is a plan view of the improved reversible pliers wherein the hand grips and jaws are operative to move in the opposite sense or direction.
Figure 4:
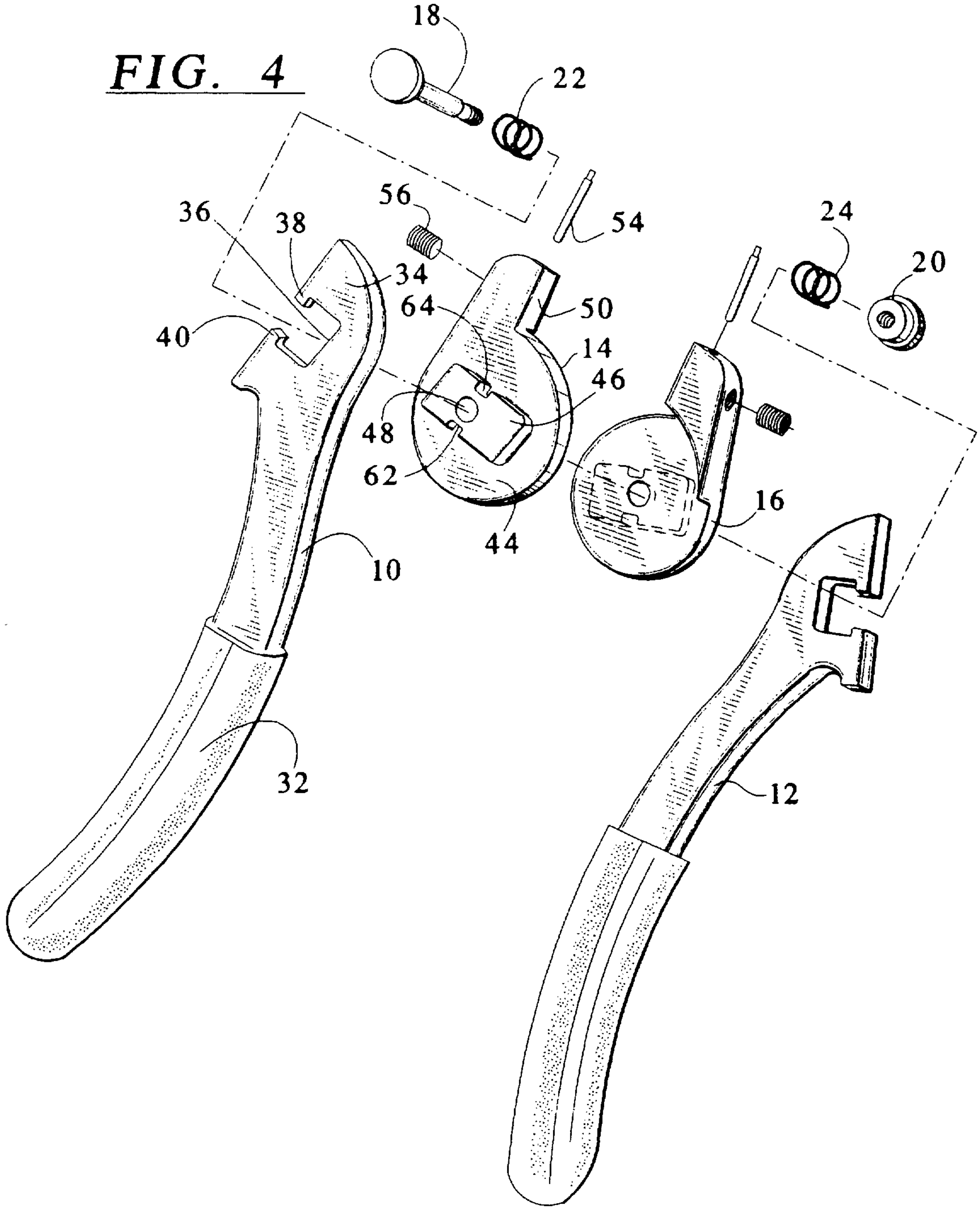
FIG. 4 is an exploded isometric view of the elements comprising the pliers.
Figure 5:
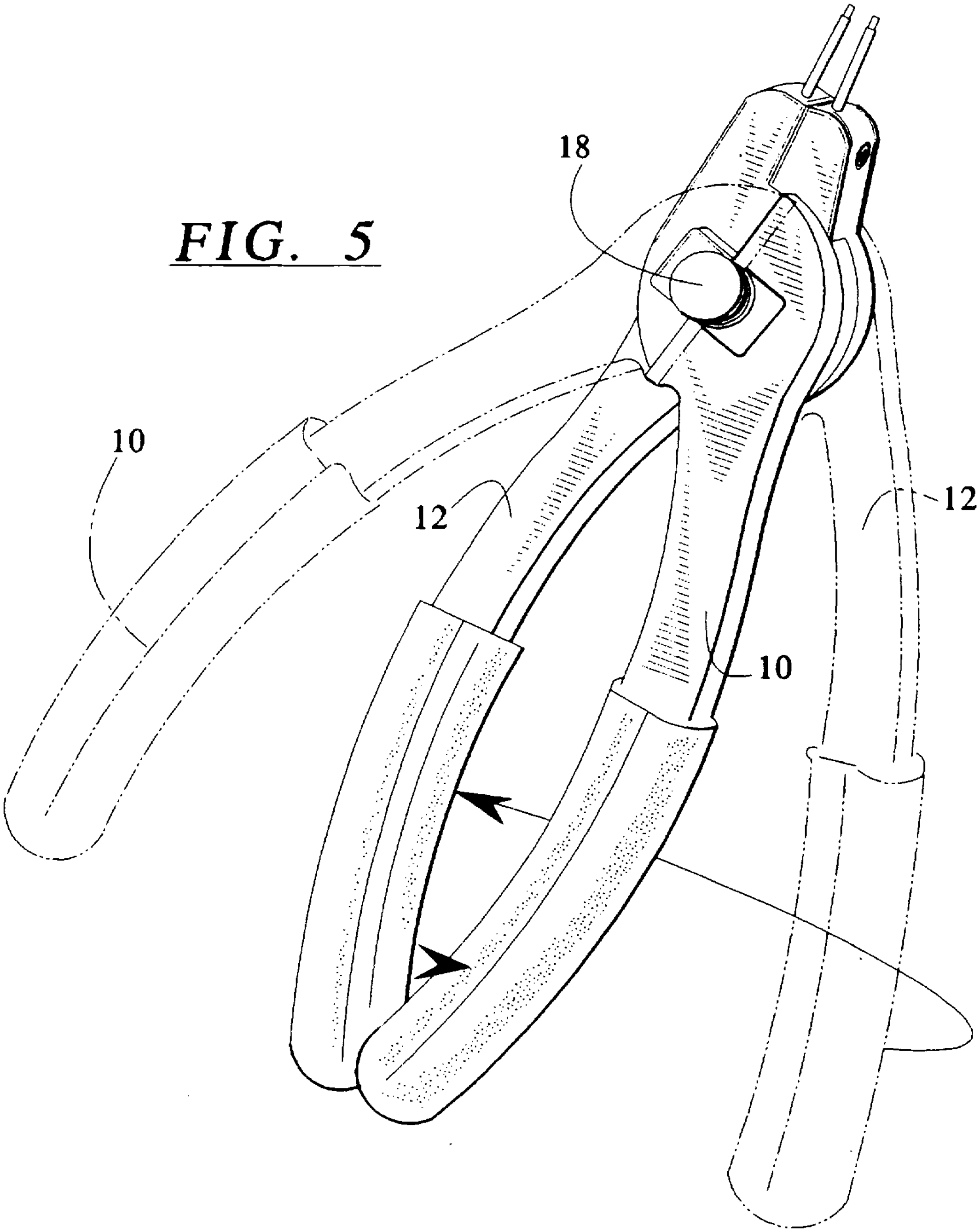
FIG. 5 is an isometric view illustrating the manual operation of the pliers and its conversion capability.
Figure 6:
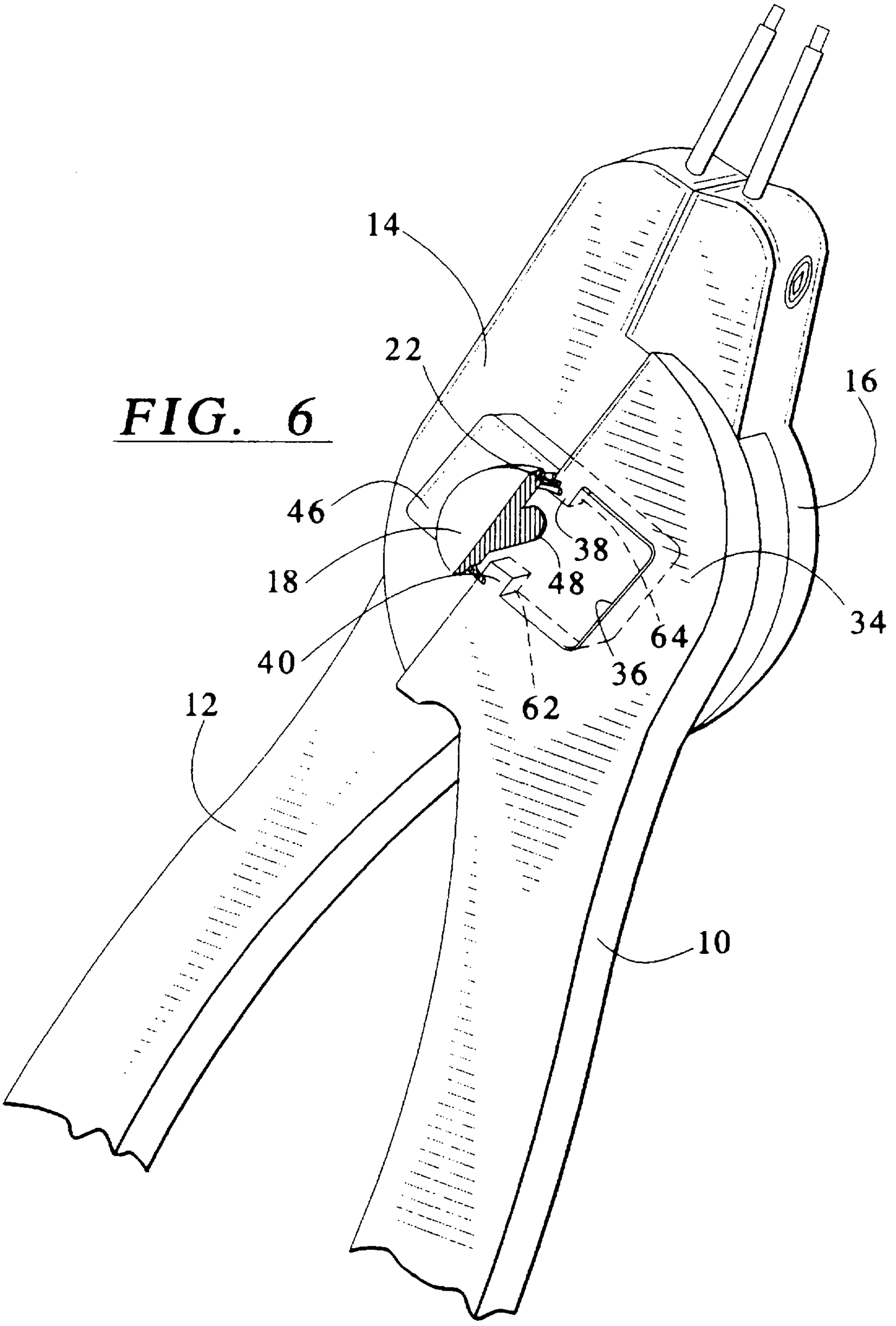
FIG. 6 is an isometric view of a handle intermediate first and second hub engagement positions with a cooperative jaw.

FIG. 1 illustrates the configuration of the assembly of parts wherein the handles 10 and 12 move in the same direction toward one another as the jaws 14 and 16 as the handles 10, 12 are moved about the pivot defined by the bolt 18. FIG. 2 illustrates the handles 10, 12 and coacting jaws 14, 16 when in a position where the handles 10 and 12 move in an opposite direction from that of the jaws 14 and 16.

With the present invention the separate handles 10 and 12 are substantially identical in construction. Similarly, the jaws 14 and 16 are also substantially identical in construction. Thus, referring to FIG. 7 especially, handle 10 includes manual grip section 30 which constitutes a longitudinal planar member. The handle 10, thus, may be cut or stamped or otherwise formed from a sheet of steel, for example. The longitudinal grip section 30 typically will include an elastomeric hand grip protector 32. At the opposite end of the handle 10 is a key or hub engagement section or portion 34. The key engagement section or portion 34 is comprised of a key receiving slot 36. Slot 36 is generally rectangular in shape as viewed in FIG. 7. The shape of the slot 36 is not a limiting feature of the invention, however. On the other hand, it is important to have the shape of slot 36 compatible for coaction or cooperation with a projecting key or hub defined on the associated jaw 14 as described in more detail below. Additionally, another important constructional feature of the section 34 is the provision of first and second pivot lugs 38 and 40, respectively, which project toward each other and are designed to define a pivot axis 42 about which the handle 10 may be pivoted with respect to the associated jaw 14 as will also be described in greater detail below. The lugs 38 and 40 are compatible with and fit within detents or slots defined in the jaw 14 again as defined in greater detail below. Note, each of the handles 10 and 12 have substantially the identical construction which facilitates the ease of manufacture of the pliers of the invention.

Referring now to the jaw construction, the jaws 14 and 16 also have a substantially identical construction. Thus, jaw 14 includes a central planar sheet or plate 44. The plate 44 is a generally flat planar member. Positioned at the center of the plate 44 is an axial hub projection 46 which defines a key. A throughbore 48 in the center of the plate 44 and projection 46 is adapted to receive the bolt 18 that cooperates with the nut 20. The jaw 14 includes a projecting active end 50 which includes a bore 52 for receipt of a snap ring engaging pin 54. The pin 54 is maintained in position by means of a screw fastener 56 positioned in a threaded passage 58 against the pin 54. The projecting end 50 has an outside surface which is coplanar with outside surface 60 of the jaw 14. The opposite side of the projecting end 50, however, is double the thickness of the main plate 44. In this manner, the jaws 14, 16 may be positioned face to face and form a co-joint uniform thickness jaw construction or assembly with active ends 50 that overlie each other or oppose each other.

The key projection 46 includes, very importantly, a first slot 62 and an opposed slot 64 defined therein aligned with the pivot axis of bolt 18 for coaction respectively with the pivot pins 40 and 38 associated with the handle 10. The shape of the key hub projection 46 is such as to be compatible or cooperative with the key opening 36 defined in the handle 10. Thus, the pivot members 38 and 40 may be positioned in the slots 64 and 62 and pivoted about axis 42 (which intersects at a right angle the axis defined by bolt 18) between a position as depicted in FIG. 1 and a position as depicted in FIG. 2. This same coactive assembly is provided for the first handle 10 and first jaw 14 and the second handle 12 and second jaw 16.

The jaws 14, 16 are thus aligned and positioned so that the center openings 48 are aligned. The bolt 18 is fitted through those center openings with springs 22 and 24 interposed between the head of the bolt 18 and the key hub projection 46 on one side and the nut 20 and the key hub projection 46 on the other side. The entire assembly is thus arranged wherein the handles 10 and 12 are positioned to engage the key hub projections 46 in one of two ways. The handles 10 and 12 may be positioned as shown in FIG. 1 or alternatively as in FIG. 2. When positioned as shown in FIG. 1, the handles 10, 12 and jaws 14, 16 move toward one another simultaneously. When positioned as shown in FIG. 2 the handles 10 and 12 move in the opposite direction of the jaws 14 and 16. Converting the operation of the pliers between the configuration of FIG. 1 and FIG. 2 is easily accomplished by pivoting the handles approximately 180° between coplanar positions with the jaws 14, 16. For example, handle 10 is moved about pivot axis 42 so as to cooperate with one or the other side of the key hub In this manner, the pliers construction is reversible. The hub projection 46 and opening 36 are oriented with respect to the pivot axis for bolt 18 to accommodate, in response to handle 10, 12 operation, a spreading of jaws 14, 16 and coming together of jaws 14, 16. The orientation may be altered to maximize the ease of use of the tool by hand manipulation by changing the relative orientation of handles 10, 17 and jaws 14, 16.

With the construction of the present invention, the snap ring engaging pins 54 may be easily changed. The construction of the jaws 14 and 16 is substantially identical thus facilitating the manufacture and assembly of the tool. The construction of each of the handles 10 and 12 is also substantially identical. The construction of the springs 22 and 24 may also be substantially identical. The entire assembly is held together by the simple nut 20 and bolt 18 combination.

Various modifications and alterations of the construction may be effected without departing from the spirit and scope of the invention. For example, the construction of the key engaging component parts of the handle 10 and jaws 12 may be modified in shape or reversed, for example. A generally rectangular interengaging key construction is depicted in the preferred embodiment. Other polygonal or curved shapes may be used. Thus, numerous shapes may be utilized provided that the handle and jaw are generally compatible in both of the pivoting positions of the handle about the axis 42. Non-symmetrical constructions may also be useful. It is also possible to eliminate, for example, one or more of the springs 22. The biasing mechanism may be altered or changed. Thus, rather than using a spring, an elastic member may be used or integrated into the bold and nut. A Bellville spring may be used, and other constructions may be provided to bias the handles. Various other modifications of the invention are also possible. The invention is therefore to be limited only by the following claims and their equivalents.

What is claimed is:

1. A reversible hand operated pliers comprising, in combination:

a first jaw having a pivot axis;

a second jaw having a pivot axis;

a pivot axis member for the first and second jaws, said first and second jaws being mounted on the pivot axis member for pivotal movement toward or away from one another;

a first separate handle member for the first jaw member having a hand grip end and a jaw displacement end, said jaw displacement end attached to said first jaw member by a biased pivot connection;

a second separate handle member for the second jaw member having a hand grip end and a jaw displacement end, said jaw displacement end attached to said second jaw member by a biased pivot connection whereby the handles are pivotal at the jaw displacement end with respect to their attached jaw between a first position defined by the first jaw and first handle and the second jaw and second handle being aligned respectively on the same side of the pivot axis member to thereby provide for jaw movement together as the hand grip ends move together; and a second position defined by the first jaw and first handle and the second jaw and second handle being aligned on opposite sides of the pivot axis member to thereby provide for jaw movement apart as the hand grip ends move together.

2. A reversible pliers comprising, in combination:

a first jaw including a hub defining a pivot axis;

a separate first handle attached to the first jaw on the hub;

a second jaw including a hub defining a pivot axis;

a separate second handle attached to the second jaw on the hub;

said hubs pivotally connected at an axis, at least one hub including a key-shaped surface and the associated handle including a key engaging end, said key engaging end being pivotal between a first and a second engagement position with the key shaper surface;

said handles each being movable for engagement with their respective hub between a position with the handles and attached jaws on opposite sides of the pivot connection axis and an alternative position with the handles and attached jaws on the same side of the pivot connection axis whereby the handles and jaws simultaneously move together in one position and the handles move together as the jaws move apart in the other position.

3. The pliers of claim 2 including snap ring engaging pins in the jaws.

4. The pliers of claim 2 wherein the jaws are identical.

5. The pliers of claim 2 wherein the handles are identical.

6. A reversible hand operated pliers comprising, in combination:

a first jaw including an active jaw end, a center pivot, and a hub including a key-shaped surface defining a first engagement position and a second engagement position;

a second jaw overlying the first jaw, said second jaw also including an active jaw end, a center pivot aligned with the first jaw center pivot whereby the jaws may be activated to move their active ends toward and away from each other, said second jaw further including a hub with a key-shaped surface also defining a first engagement position and a second engagement position;

a first manual handle having a hand grip end and a key surface cooperative end, said key surface cooperative end mounted on the center pivot of the first jaw and moveable between the first and second engagement positions with the hub for co-joint movement with the first jaw when engaged in the first or second position;

a second manual handle having a hand grip end and a key surface cooperative end, said key surface cooperative end mounted on the center pivot of the second jaw and movable between the first and second engagement positions with the hub for co-joint movement with the second jaw when engaged in the first or second position;

biasing members coacting with the first handle and jaw and second handle and jaw for biasing the respective handles and jaws into the first or second keyed engagement position; and said jaw and handle combinations in the first position coacting to cause movement of the jaws and handles about the center pivot simultaneously toward or away from each other, and in the second position coacting to cause movement of the jaws and handles respectively in opposite directions from each other.

* * * * *